United States Patent [19]

Neafsey

[11] 4,076,696
[45] Feb. 28, 1978

[54] EXTRUSION OF POLYPYRROLIDONE

[75] Inventor: James D. Neafsey, Annapolis, Md.

[73] Assignee: Chevron Research Company, San Francisco, Calif.

[21] Appl. No.: 749,121

[22] Filed: Dec. 9, 1976

[51] Int. Cl.² .............................................. C08G 20/16
[52] U.S. Cl. .............................. 260/78 P; 260/45.9 R; 260/78 S; 264/211
[58] Field of Search ...................... 260/42, 44, 45.9 R, 260/78 S; 264/211, 170

[56] References Cited

U.S. PATENT DOCUMENTS

| | | | |
|---|---|---|---|
| 2,214,442 | 9/1940 | Spanagel | 264/211 |
| 3,009,893 | 11/1961 | Barnes et al. | 260/30.2 |
| 3,026,301 | 3/1962 | Ney | 260/78 P |
| 3,097,181 | 7/1963 | Glickman et al. | 260/42 |
| 3,621,089 | 11/1971 | Edgar et al. | 264/211 |
| 3,721,652 | 3/1973 | Barnes | 264/176 Z |
| 4,001,035 | 1/1977 | Ito et al. | 260/42.44 |

FOREIGN PATENT DOCUMENTS 504,714  4/1939  United Kingdom ................. 264/211

*Primary Examiner*—Jay H. Woo
*Attorney, Agent, or Firm*—D. A. Newell; T. G. DeJonghe; L. S. Squires

[57] ABSTRACT

$C_2$–$C_{30}$ alkylamines admixed in small quantities with polypyrrolidone substantially improve the extrudability of the polymer.

10 Claims, No Drawings

EXTRUSION OF POLYPYRROLIDONE

BACKGROUND OF THE INVENTION

Poly-2-pyrrolidone is the source of a useful white synthetic fiber for the textile industry. The melt-spinnable white solid polymer is produced by the alkaline-catalyzed polymerization of 2-pyrrolidone in the presence of carbon dioxide (see U.S. Pat. No. 3,721,652). Polypyrrolidone so produced is melt-spun into filaments by extrusion from multi-hole spinnerets. In melt spinning, the polymer composition is extruded in a molten condition at a melt temperature which is generally greater than about 277° C. The extrusion must be carried out with care because of the tendency of the polymer to thermally degrade and revert to monomer. Degradation produces an unacceptable extrudate which may contain foam or bubbles. If the extrusion is attempted at an appreciably lower temperature to avoid thermal decomposition, fibers of lower tensile strength are produced. Consequently, in order to melt-extrude poly-2-pyrrolidone efficiently, one may either seek to decrease the melt temperature, or decrease the residence time at melt temperature, or to increase the thermal stability of the polymer, or to improve the extrudability of the polymeric composition. U.S. Pat. No. 3,097,181 reports that compositions containing 5-20 weight percent polypyrrolidone, the remainder being polyhexamethylene adipamide, are extrudable with no discernable degradation at the extrusion temperature. U.S. Pat. No. 3,026,301 reports the production of a 2-pyrrolidone polymer stabilized against thermal molecular weight degradation. This effect is reportedly achieved by the reaction of 2-pyrrolidone and hexamethylene diamine (0.05-3 mol percent) during the polymerization of 2-pyrrolidone. The latter patent also reports that if hexamethylene diamine is admixed with polypyrrolidone after the polymerization, the useful effect is not achieved. U.S. Pat. No. 3,009,893 reports a number of substances, which are purportedly useful in the extrusion of polypyrrolidone compositions.

BRIEF SUMMARY OF THE INVENTION

The process for the melt extrusion of the composition comprising a major amount of normally solid poly-2-pyrrolidone and a minor amount of a $C_2$-$C_{30}$ alkylamine. The composition is produced by admixing a small amount of said alkylamine with normally solid poly-2-pyrrolidone. The composition may be extruded from the melt at temperatures of 260°-280° C to produce a yarn having a tensile factor of about 18, or more.

DESCRIPTION OF PREFERRED EMBODIMENTS

A useful white synthetic fiber is produced by the melt extrusion at melt temperatures in the range 260°-280° C of a composition comprising a major amount of polypyrrolidone produced by the alkaline-catalyzed polymerization of 2-pyrrolidone in the presence of carbon dioxide and a minor amount of a $C_2$-$C_{30}$ alkylamine. The amine additives of the present invention are $C_2$-$C_{30}$ alkylamines. Such amines include polyalkylene amines, as well as monoamines, diamines, polyamines and dialkylamines, such as hexamethylene diamine, dipropylene triamine, triethylene tetraamine, tripolylene tetraamine, tetraethylene pentamine, aminodecane, diaminooctadecane, hexamine, and the many others which could be offered for purposes of illustration and exemplification. Among these alkylamines, the $C_6$-$C_{30}$ alkylamines are preferred and the higher-molecular-weight amines, especially the diamines and polyamines, are most preferred.

The polypyrrolidone of the present invention is preferably that produced by the carbon dioxide-activated polymerization of 2-pyrrolidone (see U.S. Pat. No. 3,721,652). This polypyrrolidone is sufficiently thermally stable to be melt extrudable with the exercise of some care. The addition of $C_2$-$C_{30}$ alkylamines such as hexamethylene diamine serves to depress the extrusion melt temperature and improve the extrudability of polypyrrolidone from the melt. The alkylamines allow melt extrusion at lower melt temperatures and lower rates of extrusion while producing a high quality extrudate. For example, the hexamethylene diamine-containing extrudate has better color, i.e., is whiter, and the extruded filaments have good tensile strengths.

The melt extrusion process of the present invention is normally used in the melt spinning of textile-quality yarn. "Yarn" herein refers to fibers, monofilaments and multifilaments obtained by the melt spinning of normally solid polypyrrolidone. In the process of the present invention, the polypyrrolidone/alkylamine composition is extruded at a melt temperature in the range 260°-280° C, preferably less than about 277° C, and most preferably below 270° C, to produce a yarn having a tensile factor of at least about 18, and preferably greater than 20. The "tensile factor" is defined as the tenacity of the yarn in grams/denier times the square root of the percent elongation at break.

The amines are normally added by applying a solution of the additive to the polypyrrolidone pellets before they are dried and extruded. However, any convenient method of addition and mixing of the additive into the polypyrrolidone is satisfactory, including addition to the resin before pelletization. The amines are normally used singly or in combination in amounts to provide dry polypyrrolidone pellets containing 0.05-3 weight percent, preferably 0.1-1 weight percent, and most preferably less than about 0.6 percent of total additive.

The melt-extrudable composition of matter of the present invention preferably comprises a major amount of poly-2-pyrrolidone produced by the above-described alkaline-catalyzed polymmerization of 2-pyrrolidone in the presence of carbon dioxide and a minor amount of hexamethylene diamine. Other additives or polymers may also be present, such as polycaprolactam, poly(ethylene terephthalate), polyhexamethylene adipimide, etc. But in each case a major component of the composition is the aforementioned poly-2-pyrrolidone. Minor amounts of alkylamine include amounts in excess of 0.05 but less than 3 weight percent based on the total weight of the dry polymeric composition.

The addition of hexamethylene diamine to the polymerizate is non conductive to productive results in the carbon dioxide-activated alkaline-catalyzed polymerization of 2-pyrrolidone because it tends to inhibit polymerization, as is shown in the following table:

TABLE I

Attempted Polymerization in the Presence of HMDA

| HMDA in Monomer, wt. % | Percent[1] Conversion | Nylon-4 Product MW × 10$^{-3}$ |
|---|---|---|
| 0 | 54 | 565 |
| 1.1 | 50 | 580 |
| 2.3 | 1 | 25 |

TABLE I-continued

Attempted Polymerization in the Presence of HMDA

| HMDA in Monomer, wt. % | Percent[1] Conversion | Nylon-4 Product MW × 10$^{-3}$ |
|---|---|---|
| 5.0 | 1 | — |

[1]10% potassium pyrrolidonate, 3% $CO_2$, 50° C for 22 hours.

In Table I, "HMDA" weight percent represents the weight percent of hexamethylene diamine in the polymerizate based on total 2-pyrrolidone. Percent conversion is measured as 100 times (weight of polymer)/(weight of total 2-pyrrolidone) and total 2-pyrrolidone is defined as total monomer charged to the reactor for polymerization, including that having reacted with base (catalyst). The polymerization is carried out at 10 mol percent potassium pyrrolidonate and 3 mol percent $CO_2$, based on total 2-pyrrolidone. Molecular weight is determined from specific viscosity measurements of 0.1 g of polymer in 100 cc of m-cresol solution at 25° C.

An increase in molecular weight upon the heating of polypyrrolione prepared in the presence of both carbon dioxide and HDMA was not observed (Table II). Nor is a more thermally stable polypyrrolidone produced in the presence of HMDA (Table II). In fact, no detectable HMDA was found in the polypyrrolidone polymerized in the presence of HMDA and $CO_2$ (HCl titration). It is conjectured that the HMDA inhibits polymerization and is subsequently removed during the washing of catalyst from the polymer.

TABLE II

| HMDA in Monomer, wt. % | % Conversion | Time, Min. | Weight loss[2], % | Residual Polymer MW × 10$^{-3}$ |
|---|---|---|---|---|
| 0 | 51 | 0 | 0 | 475 |
| 0 | 51 | 10 | 34 | 25 |
| 1.1 | 48 | 0 | 0 | 440 |
| 1.1 | 48 | 10 | 30 | 25 |

[1]10% potassium pyrrolidonate catalyst, 3% $CO_2$, 50° C for 22 hours.
[2]Weight loss at Time in Minutes, heated under helium at 272° C.

The mode of action of the alkylamines of this invention in the extrusion process is unknown, although they do facilitate extrusion. Nor is any reason advanced for the inhibition of the carbon dioxide-activated polymerization of 2-pyrrolidone by hexamethylene diamine. Although small but appreciable amounts of hexamethylene diamine neither improve the carbon dioxide-initiated polymerization of 2-pyrrolidone, nor provide higher molecular weight upon heating with polypyrrolidone, hexxamethylene diamine does depress the extrusion melt temperature of polypyrrolidone and improves its extrudability at those temperatures.

The present invention includes both the product of and the method for the melt extrusion of normally solid polypyrrolidone which comprises the steps of melting and extruding a composition comprising a major amount of normally solid poly-2-pyrrolidone and a minor amount of a $C_2$-$C_{30}$ alkylamine at melt temperatures of 260°-280° C. The melt extrusion may be performed on extrusion equipment which is normally utilized in the synthetic fibers industry for the melt spinning of polyamides such as polycaprolactam. The chief advantage conferred by the process of this invention is that said extrusion may be performed at a melt temperature of less than about 277° C, and preferably even at melt temperatures less than 270° C, to produce a yarn having a tensile factor of at least about 18. The melt extrusion of 100% normally solid polypyrrolidone cannot be performed at such low temperatures to yield a yarn of high tensile strength (i.e., of tensile factor about 18 or greater).

EXPERIMENTAL

Extrusion studies with hexamethylene diamine-coated granules of polypyrrolidone show that it achieves a reduction in the extrusion melt temperature and may be acting as a slip agent. The net result is that the hexamethylene diamine-coated polypyrrolidone can be extruded at a lower rate and at a lower temperature. It also gives an extrudate of improved color. The same or similar results are observed with other amines of the present invention.

The results given in Table III demonstrate depression of the extrusion melt temperature in the melt spinning of polypyrrolidone, with retention of excellent tensile strength. When the extrusion melt temperature of pure polypyrrolidone was lowered just a few degrees, the tensile factor of the product yarn was greatly reduced (Table III). Extrusion melt temperature depression is achieved without a loss of tensile factor by the inclusion of a small amount of a $C_2$-$C_{30}$ alkylamine. The tensile factor, defined as the tenacity in grams/denier times the square root of the percent elongation at break, is regarded as a significant indication of tensile strength and filamentary quality which is relatively independent of the draw ratio. Table III shows comparative results with and without alkylamine, at various melt temperatures, at the high throughput rate required for spinning 100% polypyrrolidone.

TABLE III

The Melt Spinning of Polypyrrolidione[1]

| Amine, wt.% | Yarn MW × 10$^{-3}$ | Tensile Factor T√E | Extrusion Melt Temp., ° C |
|---|---|---|---|
| None | 36 | 21 | 281 |
| HMDA, 0.5 | 35 | 25 | 270 |
| HMDA, 1.0 | 36 | 24 | 270 |
| None | — | 9 | 279 |

[1]Polymerized at 50° C for 22 hours with 10 mol percent potassium pyrrolidonate and 3 mol percent $CO_2$. Polypyrrolidone molecular weight 60-70×10$^3$. Extruded at the rate of 5.5 lbs/hr through a 15/1 extruder.

The higher extrusion throughput rate (5.5 lbs/hr) required for the satisfactory spinning of 100% polypyrrolidone is due to the shorter residence time at melt temperature demanded by the pure polymer to prevent excessive degradation. The lowering of the extrusion melt temperature and the throughput rate with retention of tensile strength, is regarded as a significant demonstration of the superiority of the method of this invention over the extrusion of pure polypyrrolidone. The lower of the throughput rate and the extrusion melt temperature with retention of the tensile factor is shown in Table IV for several compositions.

TABLE IV

Spinning Trials of Polypyrrolidione[1]

| Amine, wt.% | Yarn Mw × 10$^{-3}$ | Tensile Factor, T√E | Melt Temp., ° C | Throughput Rate, lbs/hr |
|---|---|---|---|---|
| None | 37 | 20 | 281 | 5.5 |
| HMDA, 0.3 | 41 | 19.2 | 269 | 3.8 |
| Octadecadiamine[2], 0.5 | 42 | 19 | 262 | 3.7 |

[1]See footnote 1 of Table III.
[2]$C_{18}H_{36}(NH_2)_2$

The properties of melt-spun yarns produced according to the process of this invention are illustrated in Table V.

TABLE V

Melt Spun Yarn Properties[1]

| Amine, wt.% | Melt, °C | Denier | Tenacity g/d | Elongation, % | HWS[2], % |
|---|---|---|---|---|---|
| HMDA, 0.5 | 270[3] | 100 | 5.0 | 24.3 | 24.9 |
| HMDA, 0.5 | 277[3] | 100 | 4.4 | 33.5 | 26.4 |
| HMDA, 1.0 | 269[4] | 103 | 3.9 | 39.3 | 24.7 |
| HMDA, 1.0 | 266[5] | 97 | 3.6 | 30.7 | 24.9 |

[1]See footnote 1 of Table III
[2]Hot Water Shrinkage at 180° F
[3]Yarn 3.6× draw.
[4]Throughput 4.9 lbs/hour, yarn 3× draw.
[5]Throughput 4.4 lbs/hour, yarn 3× draw.

What is claimed is:

1. A process of melt extruding normally solid poly-2-pyrrolidone comprising the steps of admixing with said poly-2-pyrrolidone a $C_2$-$C_{30}$ alkylamine to form a composition comprising a minor amount of said alkylamine, and extruding said composition at a melt temperature in the range of 260°-280° C.

2. The process according to claim 1 wherein said alkylamine is a polyalkylene amine.

3. The process according to claim 2 wherein said polyalkylene amine is hexamethylene diamine.

4. The process for the melt extrusion of normally solid polypyrrolidone according to claim 1 wherein said melt temperature is less than about 277° C.

5. The process for the melt extrusion of normally solid polypyrrolidone according to claim 1 wherein said melt temperature is less than about 270° C.

6. A yarn, having a tensile factor of at least about 18, produced by the melt extrusion of a composition comprising a major amount of normally solid polypyrrolidone and a minor amount of a $C_2$-$C_{30}$ alkylamine at a melt temperature of 260°-280° C according to claim 1.

7. The process of claim 1 wherein said composition contains from 0.05 to 3 percent by weight of said alkyl amine.

8. The process of claim 3 wherein said composition contains from 0.1 to 1 percent by weight of said hexamethylene diamine.

9. The process of claim 7 wherein said composition contains from 0.1 to 1 percent by weight of said alkyl amine.

10. The process of claim 9 wherein said composition contains less than about 0.6 percent by weight of said alkyl amine.

* * * * *